Sept. 3, 1929.   J. L. YARIAN   1,726,971
STEERING GEAR CONSTRUCTION
Filed Sept. 1, 1922
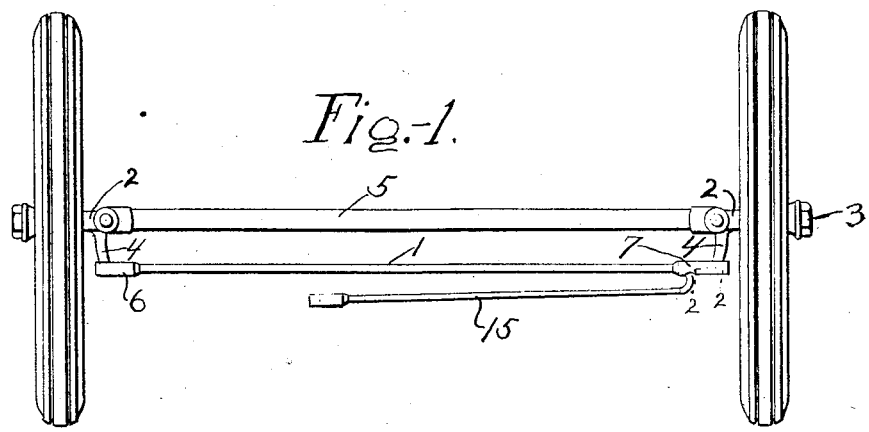
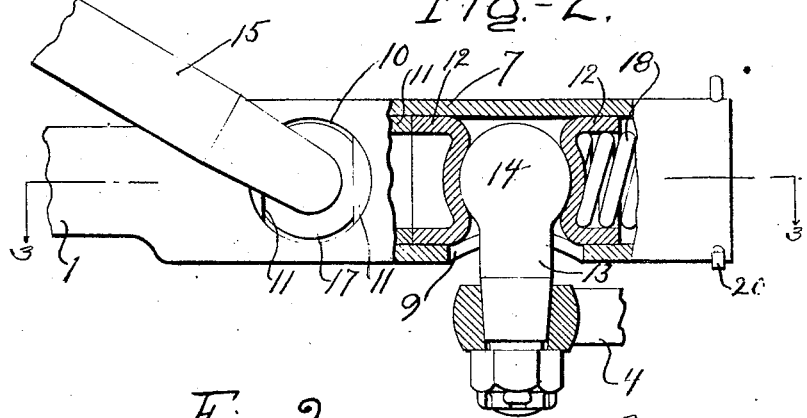
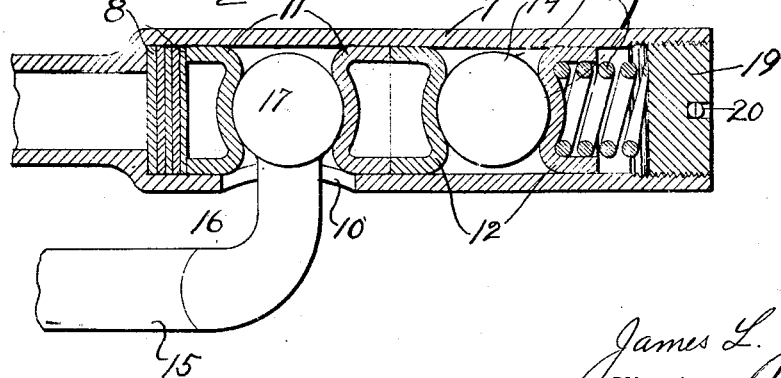
INVENTOR.
James L. Yarian
BY Parsons Bodell
ATTORNEY.

Patented Sept. 3, 1929.

1,726,971

UNITED STATES PATENT OFFICE.

JAMES L. YARIAN, OF SYRACUSE, NEW YORK.

STEERING-GEAR CONSTRUCTION.

Application filed September 1, 1922. Serial No. 585,765.

This invention relates to a steering gear construction for motor vehicles and has for its object a particularly simple and economical construction for connecting the drag link and the steering knuckles to the steering knuckle tie rod and also particularly simple means associated with the tie rod for adjusting the angle of the steering knuckles and hence the angle of the front steering wheels with respect to spreading and toeing in of the steering wheels.

The invention consists in the novel features and in the combinations and constructions hereinafter set forth and claimed.

In describing this invention, reference is had to the accompanying drawings, in which like characters designate corresponding parts in all the views.

Figure 1 is a fragmentary plan view of a steering gear embodying my invention, the front axle, steering knuckles, steering knuckle tie rod and drag link, being shown.

Figure 2 is an enlarged fragmentary sectional view, partly in elevation, of the double socket on line 2—2, Fig. 1, and contiguous parts of one end of the steering knuckle tie rod.

Figure 3 is a longitudinal sectional view partly in elevation, taken centrally of Fig. 2 on line 3—3, Fig. 2, looking downwardly.

This steering gear construction comprises a steering knuckle tie rod having sockets at its opposite ends to which the arms of the steering knuckles are connected or articulated as by ball and socket joints, the socket at one end, as the right hand end, being double and a drag link articulated in the double socket together with the arm of one of the steering knuckles.

1 designates the steering knuckle tie rod. 2 the steering knuckles, each of which has the usual wheel spindle 3 and angularly extending arm 4 which is connected to the tie rod 1. The steering knuckles are mounted in yokes at the ends of the front axle 5 in any well-known manner.

The tie rod 1 is provided with tubular sockets 6, 7, at its opposite ends, the socket 7 being of double construction, it being here shown as open at its outer end and having abutments or bottom plates 8 at its inner end and also having openings 9, 10, in its side walls. The socket 7 is also shown as provided with two sets of socket bearing members for universal joints, as ball and socket joints, which bearing members are slidable in the socket 7 through the open end thereof, the innermost member bearing against the bottom plates 8.

11 and 12 designate respectively the socket bearing members. The innermost member 11 thrusting against the bottom plates 8 and the spaces between the members 11 being alined with the opening 10 and the space between the socket members 12 being alined with the opening 9, these bearing members are preferably stamped in the proper size to have annular walls and concave or spherical end walls for receiving the balls of the ball and socket joints to be presently described.

The arm 4 of the steering knuckle is provided with a stud 13 at its outer end which terminates in a ball 14, which ball extends through the opening 9 and is located between the bearing members 12. The opening 9 is in the form of a hole larger than the ball 14 and in assembling the ball is passed through the opening 9 against the inner socket member 12, and thereafter the outer socket bearing member 12 is inserted against the ball.

15 is a drag link which in cars having a small wheel base extending crosswise of the car along the tie rod, the drag link having an angular arm 16 at its outer or right hand end extending through the opening 10 of the socket 7 and having a ball 17 arranged between the socket bearing members 11. The opening 10 is circular and large enough to permit the ball 17 to pass therethrough and after the parts are assembled the outermost bearing member 11 when pressed against the ball 17 holds the ball from removal through the opening 10. The drag link 15 is connected in the usual manner to receive movement from the shaft connected to the hand steering or tiller wheel.

The bearing members 11 and 12 are slidable in the socket 7 through the open end thereof and spring means is provided for thrusting them against the balls 14 and 17 and the abutment or bottom plates 8.

As shown in Figure 3, a coiled spring 18 is placed between the outermost socket bearing member 12 and a closure 19 for the outer end of the socket 7, this closure being in the form of a plug threading in the outer end of the socket 7 and held therein in any suitable manner as by a key 20.

The socket 6 at the left hand end of the tie rod is similar to the socket 7 with the exception that it is of single construction, it having only bearing members 12 for the arm 4 of the left hand steering knuckle, but it also having the removable abutment or bottom plates 8.

In order to straighten the steering wheels with respect to spreading, or toeing in, it is merely necessary to insert additional bottom plates 8 to cause them to toe in, or if they are toed in too much, to remove a bottom plate from each socket 6, 7. If it is necessary to straighten one wheel with respect to the other an additional plate may be put in, but one socket, or a plate taken out of one socket and placed in the other.

Heretofore, in tie rod constructions having ball and socket joints at its ends, the drag link has been provided with a similar socket for coacting with the arm having a ball provided on the tie rod. By my construction the socket on the drag link is eliminated and the double socket of the tie rod can be provided at a very slight additional cost.

Owing to the bottom or abutment plates 8 the front wheels of the vehicle can be readily and accurately adjusted.

What I claim is:

1. The combination of a member formed with a socket, provided with two openings in its side wall, two sets of socket bearing members for ball and socket joints in said socket and arranged so that the spaces between the members of each set are alined respectively with said openings, an arm extending through one of said openings and provided with a ball coacting with one set of socket members, and an arm extending through the other opening and provided with a ball coacting with the other set of socket members, the members of the sets between the ball members abutting against each other and slidable in the socket.

2. The combination of a member, formed with a socket, provided with two openings in its side wall, two sets of socket bearing members for ball and socket joints in said socket and arranged so that the spaces between the members of each set are alined respectively with said opening, an arm extending through one of said openings and provided with a ball coacting with one set of socket members, an arm extending through the other opening and provided with a ball coacting with the other set of socket members, the socket bearing members of both sets which are located between the balls thrusting against each other and being slidably mounted in the socket, and a spring within the socket and acting on some of the bearing members to thrust them axially in the socket and hold them against the balls.

In testimony whereof, I have hereunto signed my name, at Syracuse, in the county of Onondaga, and State of New York, this 31st day of August, 1922.

JAMES L. YARIAN.